United States Patent
Grayson (10) Patent No.: US 6,920,323 B1
(45) Date of Patent: Jul. 19, 2005

(54) SATELLITE COMMUNICATIONS SYSTEM AND USER TERMINAL PROVIDING PATH DIVERSITY

(75) Inventor: Mark Grayson, London (GB)

(73) Assignee: ICO Services Ltd., London (GB)

( * ) Notice: Subject to any disclaimer, the term of this patent is extended or adjusted under 35 U.S.C. 154(b) by 866 days.

(21) Appl. No.: 09/234,702

(22) Filed: Jan. 21, 1999

(30) Foreign Application Priority Data

Jan. 28, 1998 (EP) .......................... 98300581

(51) Int. Cl.[7] .............................................. H04Q 7/20
(52) U.S. Cl. ...................... 455/428; 455/13.2; 455/430; 370/324
(58) Field of Search ................................ 455/428, 13.1, 455/13.2, 429, 430, 13.3, 427, 436, 12.1, 67.11, 67.16, 101, 103; 370/317, 316, 324

(56) References Cited

U.S. PATENT DOCUMENTS

| | | | | |
|---|---|---|---|---|
| 5,561,838 A | | 10/1996 | Chandos et al. ........... 455/13.1 |
| 5,661,724 A | * | 8/1997 | Chennakeshu et al. ..... 370/324 |
| 5,867,109 A | * | 2/1999 | Wiedeman ................. 455/13.1 |
| 5,966,658 A | * | 10/1999 | Kennedy, III et al. ...... 455/428 |
| 6,021,309 A | * | 2/2000 | Sherman et al. ........... 455/13.2 |
| 6,091,933 A | * | 7/2000 | Sherman et al. ........... 455/13.1 |
| 6,104,911 A | * | 8/2000 | Diekelman ................ 455/13.1 |
| 6,138,012 A | * | 10/2000 | Krutz et al. ................ 455/427 |

FOREIGN PATENT DOCUMENTS

| | | | | |
|---|---|---|---|---|
| EP | 0 748 065 | 12/1996 | .......... H04B/7/185 |
| EP | 0 774 843 | 5/1997 | .......... H04B/7/185 |
| WO | 97/23065 | 6/1997 | .......... H04B/7/185 |

* cited by examiner

*Primary Examiner*—Rafael Perez-Gutierrez
(74) *Attorney, Agent, or Firm*—Michael J. Donohue; Davis Wright Tremaine LLP (57) ABSTRACT

In a satellite communications system, where a user terminal 10, on the surface of the earth 12, can be in diversity communication to an earth station 18 via two orbiting satellites 14, 16 at once, and there is a need, at some time, when one of the two satellites 14, 16 orbits our of range, to engage another satellite 22 in its place, the user terminal 10 is operative to suppress TDMA timeslots in its communications with the two satellites 14, 16 to listen and report on broadcast messages from another satellite 22, the suppressed timeslots being based on an assessment of which of the two satellites has the largest path attenuation.

14 Claims, 8 Drawing Sheets

SATELLITE COMMUNICATIONS SYSTEM AND USER TERMINAL PROVIDING PATH DIVERSITY

FIELD OF THE INVENTION

The present invention relates to mobile communications systems. In the example given herebelow, it relates to such systems where a user terminal, on the surface of the earth, is operative to communicate with an earth station via a communications satellite. Most particularly, it relates to such systems where the user terminal has the capacity, simultaneously, to communicate via more than one satellite or base station.

BACKGROUND

In a satellite communications system, a user terminal sends signals to and receives signals from a satellite or satellites. The signals from the user terminal are relayed, by the satellite, to and from an earth station or earth stations which connects or connect with the terrestrial telephone network. In turn, those signals received by the user terminal originate with the earth station or stations, are sent to the satellite, and relayed, by the satellite, to the user terminal.

Various forms of satellite systems can be used. Where the satellite or satellites are in a geosynchronous orbit and thus orbit the earth at the same angular velocity as the rotation of the earth, the satellite or satellites do not move relative to any point on the surface of the earth, so that there is no change in the availability of satellite radio paths. For all other, non-geosynchronous, orbits, the satellite or satellites move, relative to the surface of the earth. The orbital movement of the satellites, relative to the earth, means that communications, from a user terminal, such as a mobile telephone handset, will not necessarily endure for the full period of communications. From time to time it will be necessary to switch communications from one satellite to another. One satellite will pass below the horizon while another appears above the horizon. This is not the only consideration. Atmospheric conditions and physical obstructions, local to the user terminal, can mean that the signals to and from a particular satellite are compromised even though that satellite is well above the horizon. To counter such effects, diversity operation is adopted where the user terminal is in contact with more than one satellite for the execution of a communications activity. As one signal path deteriorates, the other can be used, and vice versa.

Communications satellites can provide an area of radio coverage, on the surface of the earth, which is divided into a series of overlapping spot beams. Each spot beam can, effectively support a separate radio channel or path. The spot beams move relative to the surface of the earth. A user terminal will pass from spot beam to spot beam during a call. Handovers between spot beams must be undertaken. It is necessary to provide diversity between adjacent spot beam radio paths for all of the stated purposes in the same way it is necessary to provide diversity between satellite radio paths.

In order to establish diversity, any new satellite or spot beam, becoming available to a user terminal, must undergo an assessment to determine when it becomes a viable radio path option. In so being assessed, it is necessary for the user terminal to receive a signal from the satellite or spot beam to be assessed and report the result back to the earth station via the radio paths already established. A system for entering diversity operations is disclosed in WO97/23065 (Ericsson).

There may be many paths open to a user terminal. Because of cost and circuitry constraints, the user terminal itself may be able only to accommodate a limited number of paths within its operation, for example a maximum of two paths can be supported. When required to make an assessment of a further radio path, the user terminal must further reduce the number of communications paths for the assessment to be made on the limited resources of the user terminal. For seamless operation, with least risk of signal disruption, there is required a solution to the problem of path allocation during the assessment period.

The present invention concerns itself with the manner in which the assessments can be made, and the result reported, without any apparent interruption to any currently active, diversity communications. It seeks to overcome the problems associated with limited numbers of channels being available to a user terminal despite the potential number of channels or paths being larger. It also seeks to overcome the problem associated with selection and allocation of the limited number of channels or paths, by the user terminal, when meeting the requirement to assess other possible future paths, with least risk of communications interruption.

The present invention consists in a satellite communications system wherein a user terminal may be in radio contact with one or more earth stations through two or more radio paths to two or more satellites and wherein another satellite may potentially be included among said two or more satellites, said system being characterized by said user terminal being operative to assess which of said two or more satellites presents the highest radio path attenuation to said user terminal and to interrupt the radio path between said user terminal and that one of said two or more satellites which presents the highest path attenuation for said user terminal to assess the signal quality and suitability of said another satellite.

The invention further provides a system, wherein the user terminal is operative to select which of the radio paths between the user terminal and the two or more satellites to interrupt.

The invention further provides a system, wherein one of two earth stations providing said paths is operative to select which of the radio paths between the user terminal and the two or more satellites to interrupt.

The invention, yet further, provides a system, wherein each of the two or more satellites is operative to provide indication of its respective transmission power to the user terminal, wherein the user terminal is operative to measure the received signal from each of the two or more satellites, and wherein the radio path attenuation for each of the two or more satellites is calculated by comparing the received signal with the indication of transmitted power.

Still further, the invention provides a system wherein the user terminal is operative to provide indication to at least one of the earth stations for the selection of that radio path with most attenuation to be interrupted.

Yet further, the invention provides a system, wherein the user terminal is operative to indicate to at least one of the two or more earth stations which one of the two or more corresponding radio paths to interrupt.

BRIEF DESCRIPTION OF THE DRAWINGS

The invention is further explained, by way of example, by the following description, in conjunction with the appended drawings, in which.

DETAILED DESCRIPTION

Figure 1:
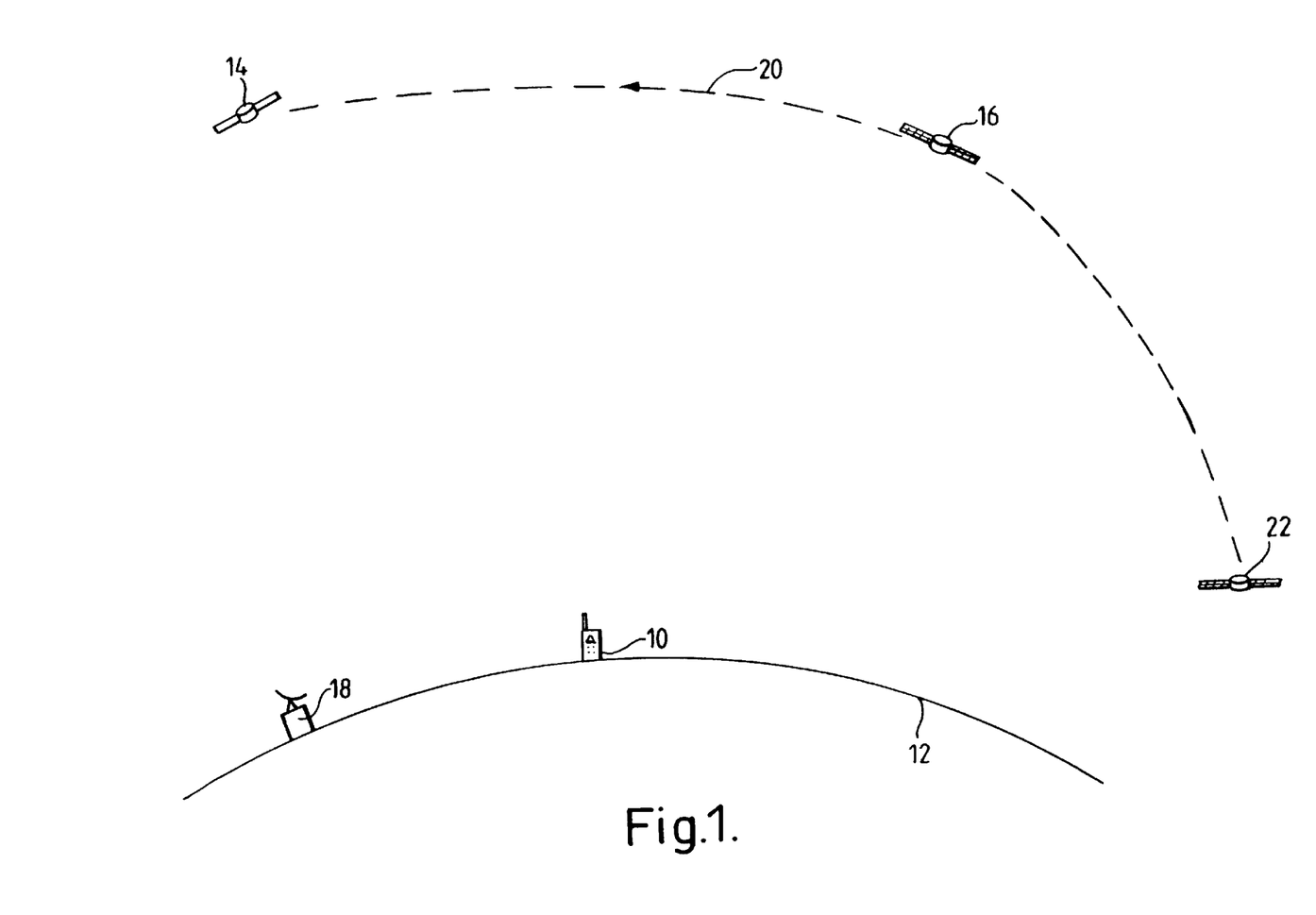
FIG. 1 shows the general component parts of a satellite communications system, according to the preferred embodiment of the present invention.

FIG. 1 shows the situation wherein the present invention operates. A user terminal 10, optionally but not necessarily in the form of a portable telephone handset, is located on the surface of the earth 12. The user terminal 10 is in communication, simultaneously, with a first communications satellite 14 and a second communications satellite 16 which, in turn, are both in communications contact with a satellite earth station 18. The first 14 and second 16 communications satellites are allocated to the user terminal 10 and operating in duplex, in a selected one of several manners, later to be described, for messages and voice communications to be passed from the user terminal 10 to the earth station 18 and from the earth station 18 to the user terminal 10, both paths being via a satellite 14, 16.

In FIG. 1, both the first and second satellites 14 16 are well above the horizon, moving in an orbit 20 about the earth 12. The first satellite 14, at some future time, will fall below the horizon and become inaccessible to the user terminal 10. Meanwhile, a third satellite 22 is just lifting above the horizon and, at some future time, will become a useful radio path for the user terminal 10 to communicate with the earth station 18.

While the user terminal 10 is, at the instant of FIG. 1, securely in duplex communications with the first satellite 14 and the second satellite 16, this situation will not continue and the overall system (18, 14, 16) has to make a decision, firstly, to decide when the first satellite 14 is unusable and when the third satellite 22 becomes usable. Being in communications means that signals from the first satellite 14 are always being monitored, so it is a relatively simple matter to assess its accessibility. On the other hand, the third satellite 22 is not in the communications loop, and any attempt to assess its signals will pose an interruption to the duplex communications currently under way between the user terminal 10 and the first 14 and/or second 16 satellites. The present invention, as hereinafter described, seeks to provide a solution to the posed interruption. It will be understood that the present invention details the operation whereby the maximum number of radio paths able to be simultaneously supported is two but those skilled in the art are able to apply the techniques whereby any number of paths can be simultaneously supported by a user terminal.

Figure 2:
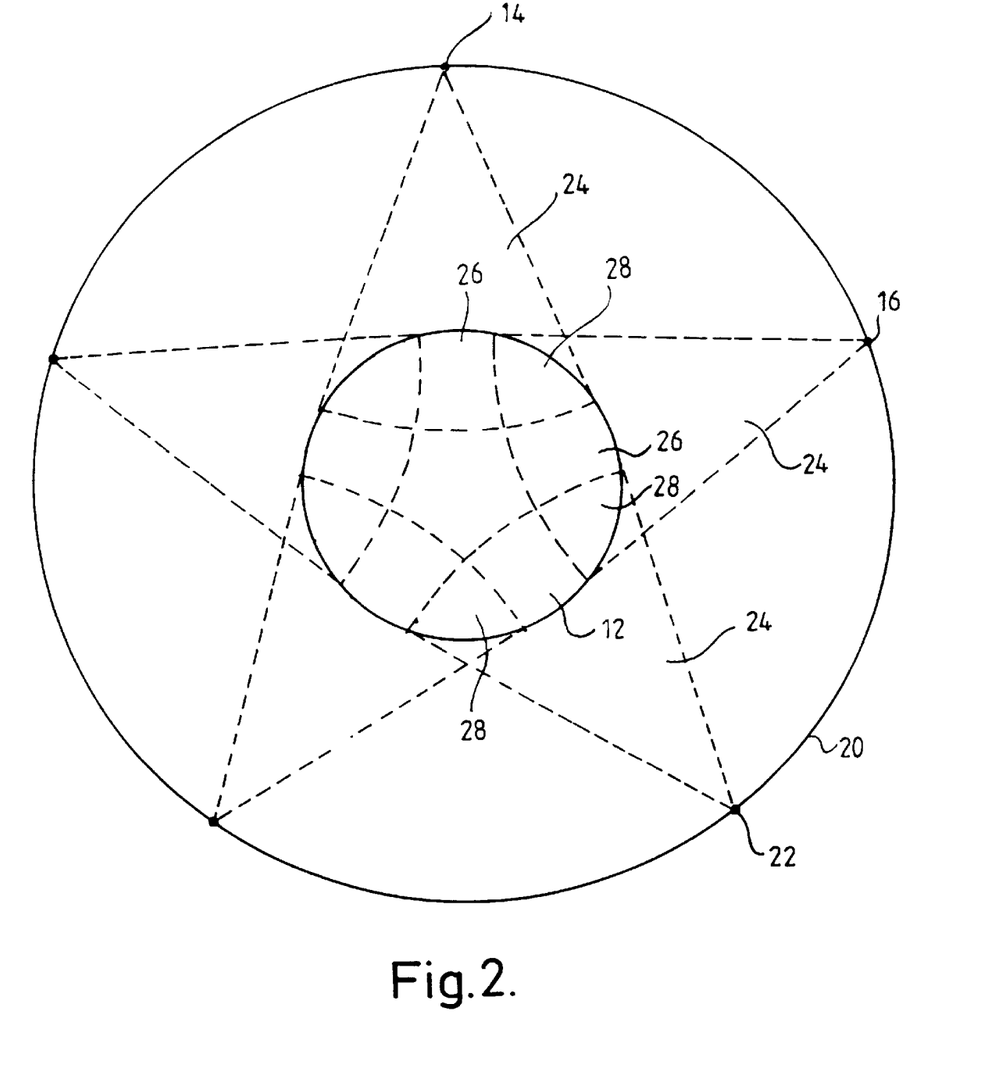
FIG. 2 shows communications satellites, disposed in an orbit about the Earth, and further shows the cones of radio coverage of each satellite.

FIG. 2 shows a second area where the present invention is applicable. The satellites 14, 16, 22 are shown, in a preferred embodiment, to scale, orbiting 20 at a height of 10,350 Km above the surface of the earth 12. Each satellite 14 16 22 projects a cone of radio coverage 24 onto the surface of the earth 12. The cones of radio coverage 24 overlap to provide first areas 26 where only one satellite is accessible should the user terminal 10 be so situated, and second areas 28 where two satellites are accessible.

FIG. 2 shows only one orbit 20. In the preferred embodiment there are two orbits, each at the same height, each with a plane at ninety degrees to the plane of the other and both at forty-five degrees to the equator. The consequence of this is that satellites 14, 16, 22 can be available from more than one orbit.

Figure 3:
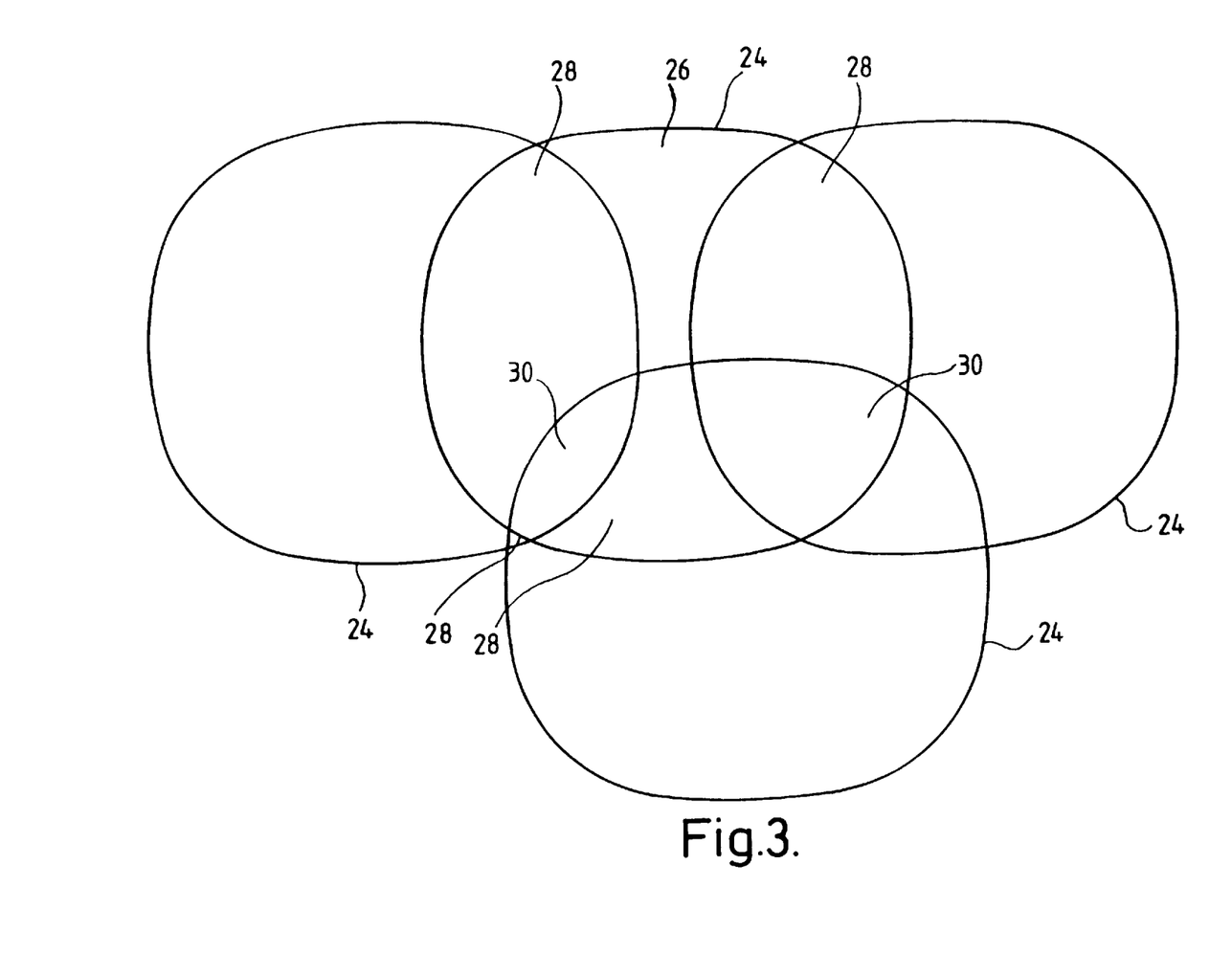
FIG. 3 shows the cones of radio coverage of FIG. 2 as they can overlap on the surface of the Earth.

FIG. 3 shows an exemplary pattern of resulting radio coverage on the surface of the earth 12 with the cones 24 of radio coverage providing the first areas 26 with single satellite coverage, the second areas 28 with double satellite coverage, and even third areas 30 with triple satellite coverage. The invention is not restricted to such orbital heights and satellite spacing, so that it is possible to imagine areas with more than three satellites potentially providing a radio path to the user terminal 10.

Figure 4:
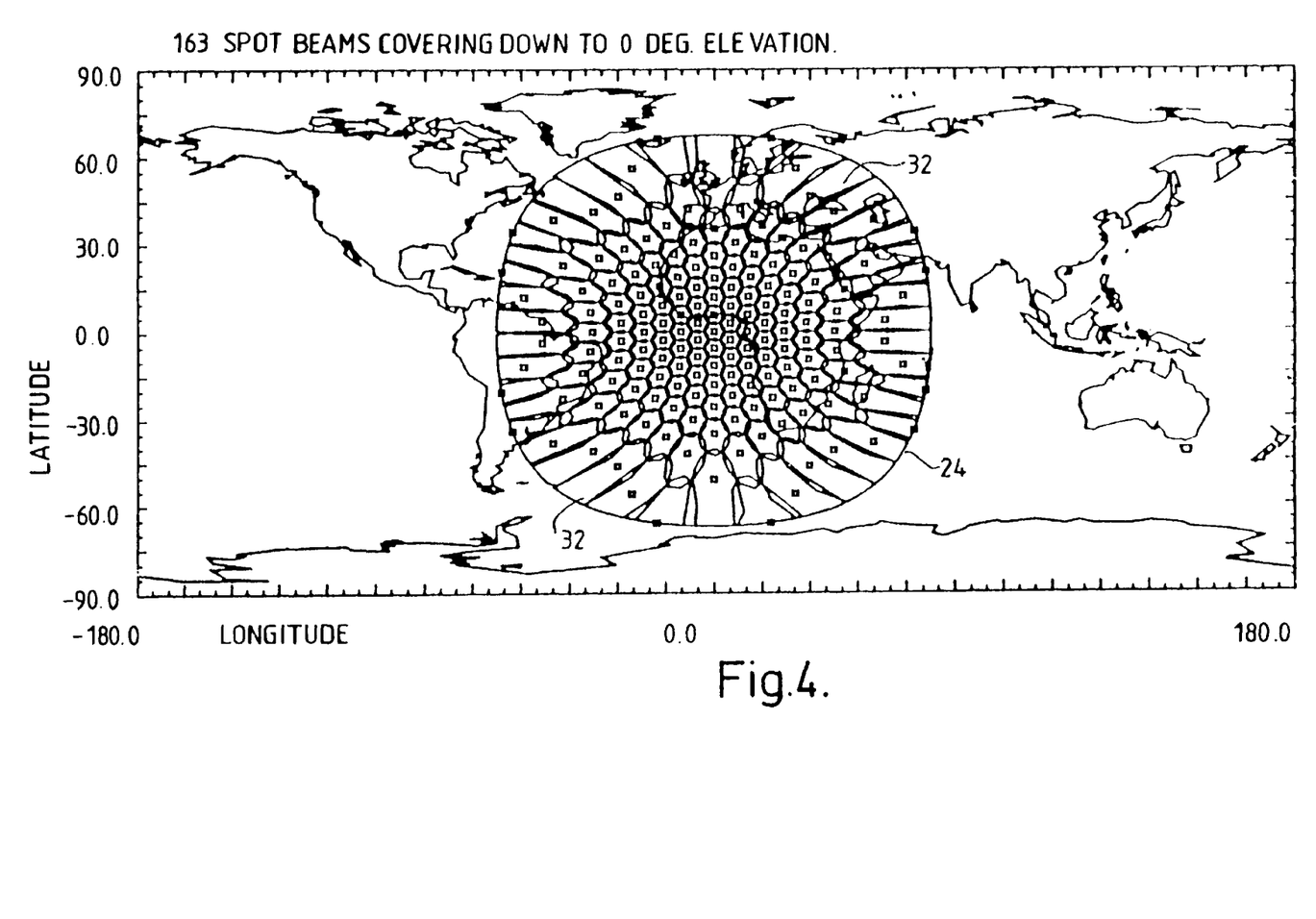
FIG. 4 illustrates how each cone of radio coverage is divided into a plurality of spot beams.

FIG. 4 shows one cone of radio coverage 24, for convenience, centred over latitude zero degrees and longitude zero degrees, on a distorted pattern (mercators projection) of the surface of the earth 12, and illustrates how each cone of radio coverage 24 is divided into a plurality of spot beams 32 (in the preferred example there are 163 spot beams 32, the invention not being restricted to such number) which, in an overlapping manner, fill the cone of radio coverage 24.

Figure 5:
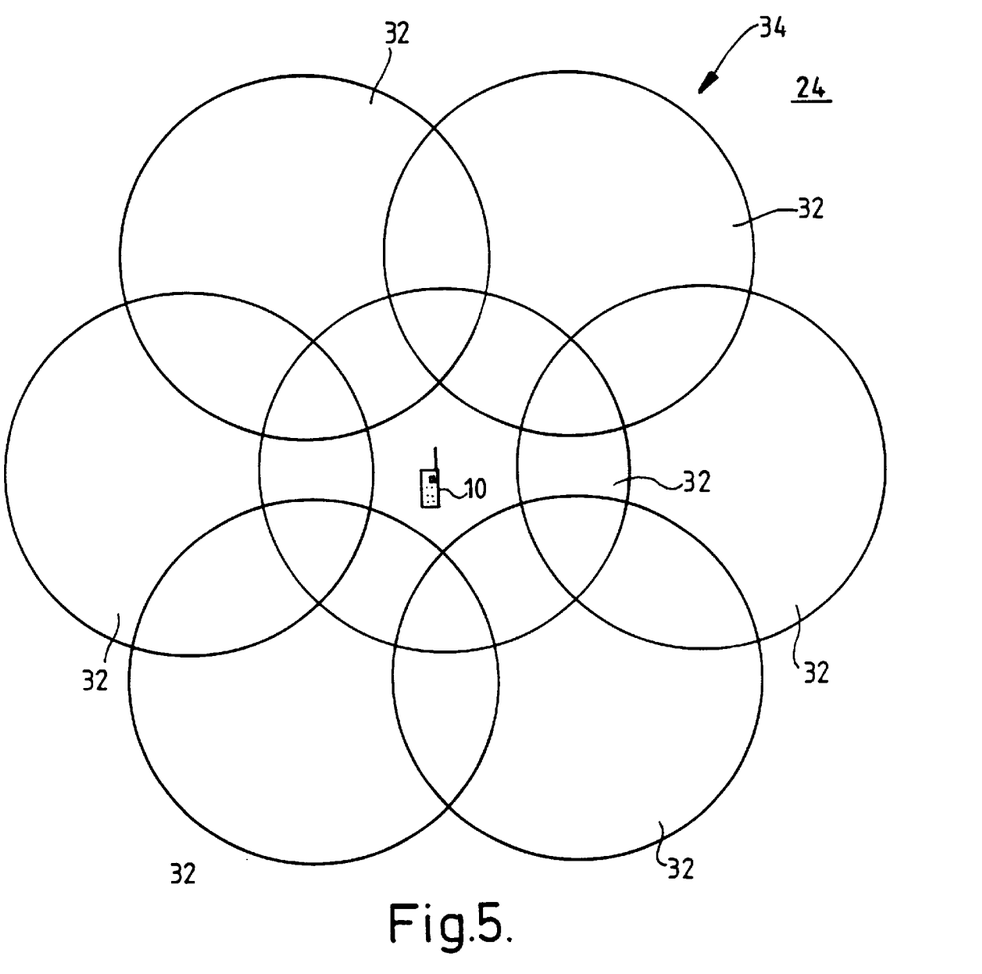
FIG. 5 illustrates a user terminal within a pattern of spot beams from FIG. 4 and serves to show the necessity for spot beam handover.

FIG. 5 shows a magnified portion of FIG. 4 where the spot beams 32 are illustrated as overlapping areas of radio propagation, each potentially a separate radio path. The user terminal 10 is shown as being in one of the spot beams 32. The entire pattern of spot beams 32 moves over the surface of the earth 12 as indicated by the first arrow 34, while the user terminal 10 is fixed in position. As the cone of radio coverage 24 moves, relative to the user terminal 10, so the terminal 10 effectively moves from a first spot beam 32 to second spot beam 32. As before, in the satellite example, there are areas which are covered by just one, two, or three spot beams 32. As the cone of radio coverage 24 moves, so the user terminal 10 may have simplex operation with just one spot beam, duplex operation with two, triplex operation with three, and so on, as well as being required to assess the availability of approaching spot beams 32. The situation becomes more complex when it is realized from FIG. 4, that plural patterns of spot beams 32 may impinge upon the same area. The present invention is as much concerned with spot beams as it is with satellites. Essentially, the present invention is concerned with radio paths.

For clarity, a radio path is hereinbefore and hereinafter defined as a radio link, either generalized on the surface of the earth 12 (as in a cone 24 of radio coverage) or localized upon the surface of the earth 12 (as in a spot beam), between a user terminal 10 and a communications satellite 14, 16, 22.

In the following description, it is to be understood that the user terminal 10 is adapted to measure the differential time (for example, from an internal clock), differential frequency (again, for example, by use of the internal clock source and a counting technique) and signal strength of an assessed signal. As an example of the technique for measuring signal strength for a received signal, a typical user terminal 10 might employ an analog-to-digital converter, somewhere in the reception chain, to convert the instant succession of analog voltages into a stream of binary numbers, each representative of the instant amplitude of the analog voltage at the moment of sampling. The amplitude of the incoming signal is thus converted into a number which can be used as a measure of the incoming signal strength. It is not significant to the present invention exactly how each quantity, hereinbefore and hereinafter described, is calculated or measured, simply that the action of calculation or measurement can be made.

The preferred embodiment of the invention is hereinafter described in terms of a TDMA (time-division multiple access) system where information is sent in timed bursts, each consisting in six digitized data blocks representative either of data/commands or representative of communications signals such as voice or facsimile. It is to be understood that the present invention is applicable to other forms of communication protocols such as CDMA or AMPS/DAMPS, and that TDMA is merely given as an enabling example of the invention.

Diversity operates in at least two modes. In a first mode, full diversity, both satellites 14 16 transmit to the user terminal 10 and the user terminal 10 responds to both satellites 14 16. This requires the use of two TDMA data blocks, being a one sixth part of a contiguous series of data blocks making up a TDMA burst, offset from each other by at least three data blocks in the usual type (low cost) of user terminal 10, but capable of being more closely spaced than three data blocks with a user terminal 10 of better performance where switching between frequencies and switching between the modes of reception and transmission is more rapid and certain.

In a second mode, partial diversity, the user terminal selects 10 to which of the first or second satellites 14, 16 10 it will transmit. Only one of the first or second satellites 14, 16 is selected at any one instance of transmission. Which satellite 14, 16 is selected can change from one TDMA burst to the next. The user terminal 10 receives TDMA bursts from each satellite 14, 16, assesses the path loss, and selects that satellite 14, 16 with the lesser or least path loss for its own transmission. This provides the best signal to noise ratio at the selected satellite 14 or 16 for the least transmission power from the user terminal 10. This latter mode is often preferred for saving battery power in the user terminal 10, since only one satellite 14, 16 receives a transmitted signal from the user terminal 10 which, consequently, transmits only half as often as in full duplex and saves half of the transmission battery power drain.

In full diversity, in the preferred embodiment there is no instant requirement for the user terminal 10 to select a satellite 14, 16. Both 14, 16 are used. In partial diversity, the user terminal 10 is required to measure the path loss to each satellite 14, 16. The means of so measuring the path loss is simply to measure the signal strength of reception from each satellite 14, 16. The manner in which this can be achieved has, earlier, been described. An assessment of bit-error-rate is also possible. As will later be described, the user terminal 10 will also, for preference, have a knowledge of the transmission power of each satellite 14, 16 thereby to make an accurate assessment of the path loss.

The present invention concerns itself with both forms of diversity, and is equally applicable to both and other forms of diversity, e.g. using 3 or more simultaneous paths.

The form of radio path assessment used in partial diversity is applied, both in full diversity and in partial diversity, to allow the user terminal 10 to select the burst from that satellite 14, 16 with the greater path loss for the user terminal 10 to listen for a signal from a selected another satellite (in this instance, the third satellite 22) in the burst which, otherwise, would be allocated to that satellite 14, 16 with the greatest path loss. In this way, the communications system is assured of receiving the best quality signal from the user terminal 10, the user terminal is assured of receiving the best quality signal from a satellite 14, 16, and, at the same time, the user terminal 10 is in a position to measure the signal quality of another satellite 22 with a view to its later incorporation into the communications network using the particular user terminal 10.

Figure 6:
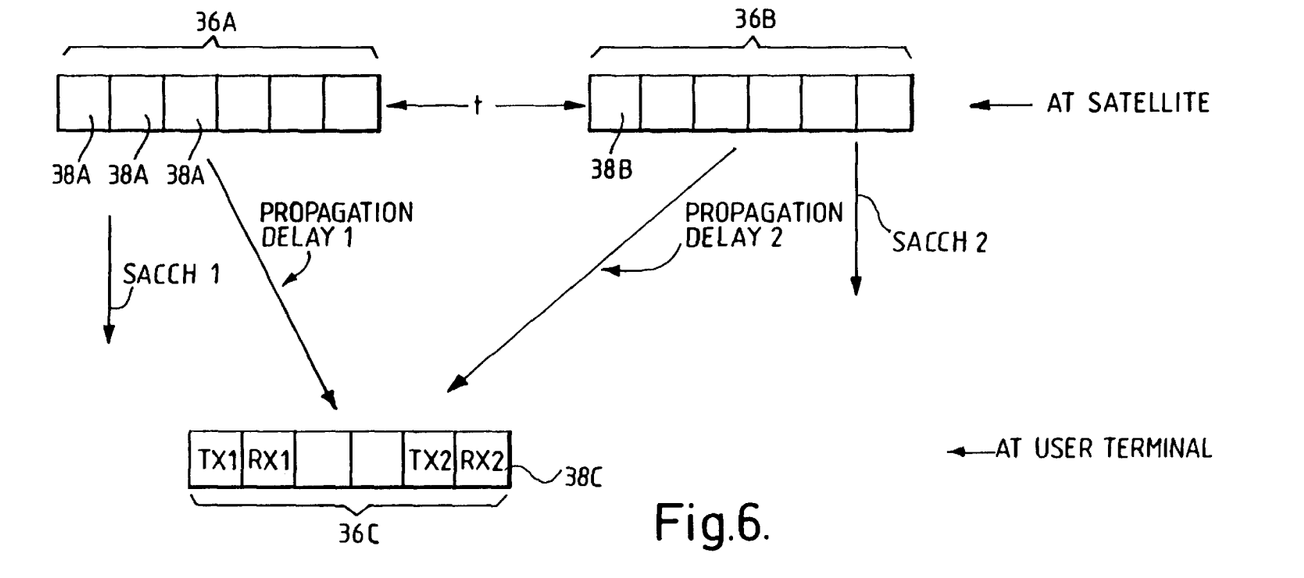
FIG. 6 shows the structure of the TDMA signal blocks from different satellites, used in the preferred embodiment of the present invention, and further shows their time relationships at the user terminal.

FIG. 6 is a diagrammatic representation of the structure of the TDMA burst and data block structure.

First satellite burst 36A originates from the first satellite 14 and is divided into six data blocks 38A. The second satellite burst 36B originates with the second satellite 16 and also comprises six data blocks 38B. The earth station 18 arranges that a delay t exists between the first 36A and second 36B bursts so that the propagation delay (propagation delay 1) between the first satellite 14 and the user terminal 10 and the propagation delay (propagation delay 2) between the second satellite 16 and the user terminal 10 are so compensated that the first 6 data blocks 36A and the second 6 data blocks 36B arrive at the user terminal 10 at the same time to coincide with a third 6 data blocks 36C which represents the set of timings used by the user terminal 10. It is to be understood that the satellites 14, 16 have separate sending and receiving antennae, so that each of the data blocks 36A 36B can be used both for transmission or reception. The user terminal 10 has but one antenna, so that each data block 36C is selectably usable for transmission or reception, but not, simultaneously, for both.

At the user terminal 10, on call setup or registration, a first transmission data block TX1 is allocated for transmission to the first satellite 14. A first reception data block RX1 is allocated for reception from the first satellite 14. A second transmission data block TX2 is allocated for transmission to the second satellite 16, and a second reception data block RX2 is allocated for reception from the second satellite 16. At the same time, supplementary information is sent between the first satellite 14 and the user terminal 10 through a first Slow Associated Control Channel SACCH1 and supplementary information is sent between the second satellite 16 and the user terminal through a second Slow Associated Control Channel SACCH2. Nominally, the information sent on SACCH 1 and on SACCH2 will be identical. The information sent from the satellite 14, 16 to the user terminal 10 includes an indication of the transmission power that the particular satellite 14, 16 is using to send signals to the user terminal 10.

It is to be appreciated that each burst 36 is merely a time window to be used in whichever way that the system requires, for transmission or reception. Those data blocks 38 not allocated to the user terminal 10 in the example given, may be used to communicate between the satellite 14, 16 and any other user terminal 10. Each data burst comprises an encrypted and encoded digital representation of analog signals, such as speech or facsimile, to be sent either from the user terminal 10 to a satellite 14, 16 or from a satellite 14, 16 to the user terminal 10. By the exchange of data blocks 36, so the progress of a telecommunications operation is achieved.

Figure 7:
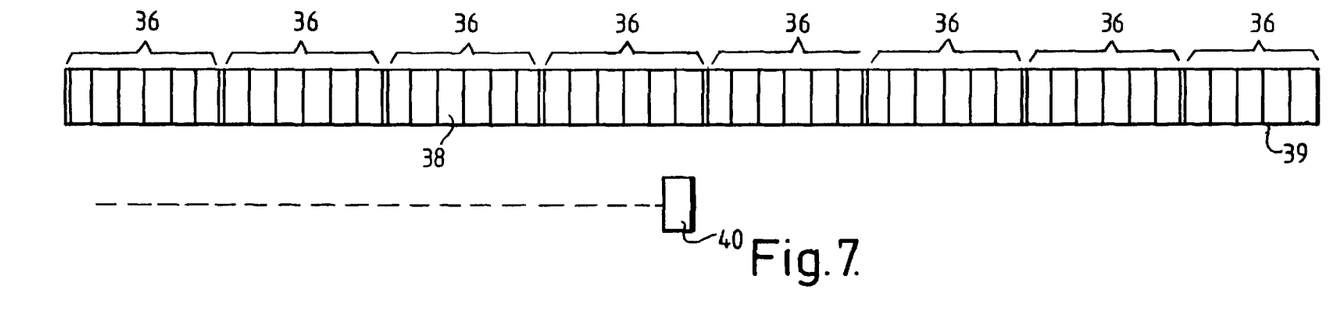
FIG. 7 shows the relationship between the data blocks (as seen at the user terminal) and the broadcast message from a third satellite.

FIG. 7 shows the relationship between data bursts and the broadcast signals from the third satellite 22 of the present example.

At the user terminal 10, the bursts 36 form into a continuous string 39. However, the broadcast channel (BCCH) from the third satellite 22, provides a BCCH burst 40 which, while being as long (or thereabouts) as a data block 38, is not synchronized for propagation delays between the third satellite 22 and the user terminal 10 and so can straddle the time of two adjacent data blocks 38, The BCCH burst 40 is repeated every 25 TDMA burst periods 36 and, in addition, "walks" along each TDMA burst so that on subsequent appearances of the BCCH burst 40 the BCCH burst 40 moves from a first data block 38 to a second data block 39, so that no one data block 38 is monopolized by the BCCH burst 40. This is achieved by the BCCH burst 40 not being at exactly 25 TDMA burst 36 period, but being delayed (or incremented, but not both, the process being unidirectional) by one data block 38 period between recurrences. The BCCH burst 40 returns to the original data block after one second, and then recycles through them, according to the timings of the preferred embodiment of the present invention. Other timings are possible, within the spirit of the invention. The BCCH burst 40 carries information concerning the amount of power being used to transmit the BCCH burst from the third satellite 22. Alternatively, the BCCH power information can be carried on SACCH1 or SACCH2.

The user terminal 10, by switching off one of its reception slots RX1 RX2 for a long enough period, is sure, eventually, to receive the BCCH burst from the third within the switched off reception slot RX1 or RX2 and will be able to measure the signal strength of the received BCCH burst 40 and will also be able to decode the information concerning the amount of power used to transmit the BCCH burst 40 which may be on the BCCH 40 itself, or on SACCH1 or SACCH2. A calculation of the path loss or attenuation between the third satellite 22 and the user terminal 10 can then be made together with possible synchronization information.

Likewise, the user terminal 10, when in communication with the first 14 or second 16 satellites, knows through the slow associated control channels SACCH1 or SACCH2 just how much power each satellite 14, 16 is using, and can measure the received signal strength from each satellite 14, 16, for a similar calculation of path attenuation or path loss to be made.

Figure 8:
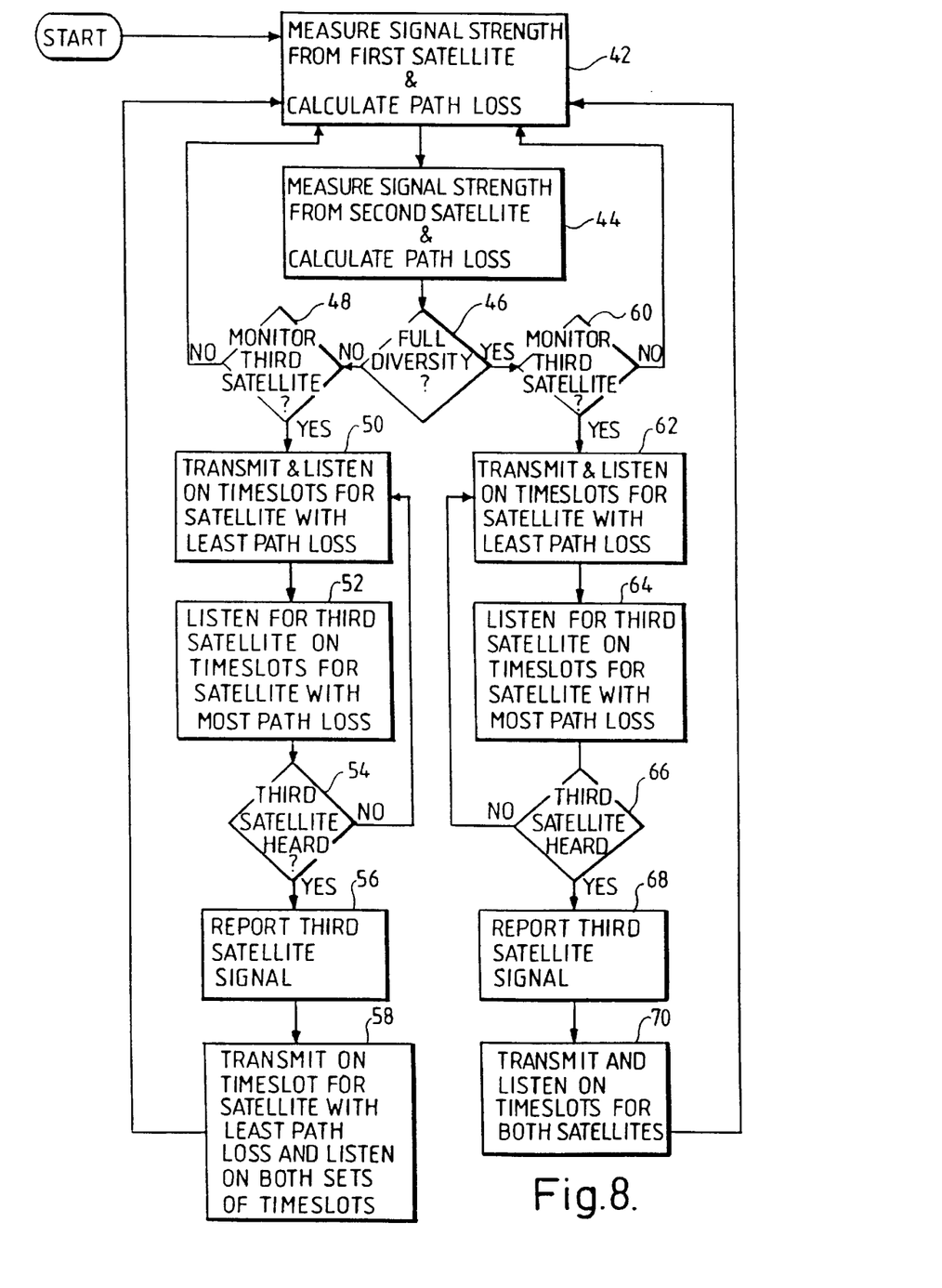
FIG. 8 is a flow chart showing the activity of the user terminal when operating according to the preferred embodiment of the present invention when determining the desirability of engaging a further satellite.

FIG. 8 is a flow chart of the activity of the user terminal 10 when assessing the viability of the third satellite 22.

Entry is to a first operation 42 where the user terminal 10 measures the signal strength from the first satellite 14, notes the reported transmission power from SACCH1, and calculates the path loss between itself 10 and the first satellite 14. Control then passes to a second operation 44 where the user terminal 10 measures the signal strength from the second satellite 16, notes the reported transmission power from SACCH 2, and calculates the path loss between itself 10 and the second satellite 16.

Control next passes to a first test 46 which establishes whether or not full diversity is in operation.

If full diversity is not in operation, control passes to a second test 48 which establishes whether or not the user terminal 10 has been commanded to monitor a third satellite 22. If no such command has been received, control simply passes back to the first operation 42.

If the user terminal 10 has received a command to monitor a third satellite 22, control passes to a third operation 50 where the user terminal transmits and receives on those timeslots TX1, RX1 or TX2 RX2 which are allocated for whichever one of the first or second satellites 14, 16 has the least path loss as determined by the first 42 and second 44 operations.

Control then passes to a fourth operation 52 where the user terminal 10 uses at least the reception data block time RX1 or RX2 for that one of the first or second satellites 14, 16 which has the greater path loss to listen for the BCCH burst 40 from the third satellite 22. As a speed-up option, the user terminal 10 may also elect to use the transmission data block 38 timeslot TX1 or TX2 from that one of the first or second satellites 14, 16 which has the greater path loss to listen for the BCCH burst 40 from the third satellite. A third test 54 checks to see if the BCCH burst 40 from the third satellite 22 has been received, returning control to the third operation 50 if the BCCH burst 40 has not been received.

Eventually, the BCCH burst 40 will be received and the third test 54 passes control to a fifth operation 56 where the user terminal 10 reports the viability of the signal from the BCCH burst 40 of the third satellite 22 back to the earth station 18 via SACCH1 or SACCH2. The assessment may be made based on a calculation of path loss (calculated by the user terminal 10 having received indication of the transmission power of the BCCH burst 40 from the BCCH burst 40 itself, or otherwise (e.g. via SACCH1 or SACCH2), or the assessment may be made at the earth station 18 itself, based on a simple report of signal strength of the BCCH burst 40 made by the user terminal 10 and predicated on the concept that the earth station 18 already knows the transmission power of the BCCH burst 40 from the third satellite 22.

Thereafter, control is passed to a sixth operation 58 where the user terminal 10 returns to half-duplex operation between the first 14 and second 16 satellites, and hereinbefore already described. Finally, control returns to the first operation 42.

If the first test 42 detects that full diversity is in operation, control passes to a fourth test 60 which establishes whether or not the user terminal 10 has been commanded to monitor a third satellite 22. If no such command has been received, control simply passes back to the first operation 42.

If the user terminal 10 has received a command to monitor a third satellite 22, control passes to a seventh operation 62 where the user terminal 10 transmits and receives on those timeslots TX1, RX1 or TX2, RX2 which are allocated for whichever one of the first or second satellites 14, 16 has the least path loss as determined by the first 42 and second 44 operations.

Control then passes to an eighth operation 64 where the user terminal 10 uses at least the reception data block time RX1 or RX2 for that one of the first or second satellites 14, 16 which has the greater path loss to listen for the BCCH burst 40 from the third satellite 22. As a speed-up option, the user terminal 10 may also elect to use the transmission data block 38 timeslot TX1 or TX2 from that one of the first or second satellites 14, 16 which has the greater path loss to listen for the BCCH burst 40 from the third satellite. A sixth test 66 checks to see if the BCCH burst 40 from the third satellite 22 has been received, returning control to the seventh operation 62 if the BCCH burst 40 has not been received.

Eventually, the BCCH burst 40 will be received and the sixth test 66 passes control to a ninth operation 68 where the user terminal 10 reports the viability of the signal from the BCCH burst 40 of the third satellite 22 back to the earth station 18 via SACCH1 or SACCH2. The assessment may be made based on a calculation of path loss (calculated by the user terminal 10 having received indication of the transmission power of the BCCH burst 40 from the BCCH burst 40 itself, or otherwise (e.g. via SACCH1 or SACCH2)), or the assessment may be made at the earth station 18 itself, based on a simple report of signal strength of the BCCH burst 40 made by the user terminal 10 and predicated on the concept that the earth station 18 already knows the transmission power of the BCCH burst 40 from the third satellite 22.

Thereafter, control is passed to a tenth operation 70 where the user terminal 10 returns to full duplex operation between the first 14 and second 16 satellites, and hereinbefore already described. Finally, control returns to the first operation 42.

Figure 9:
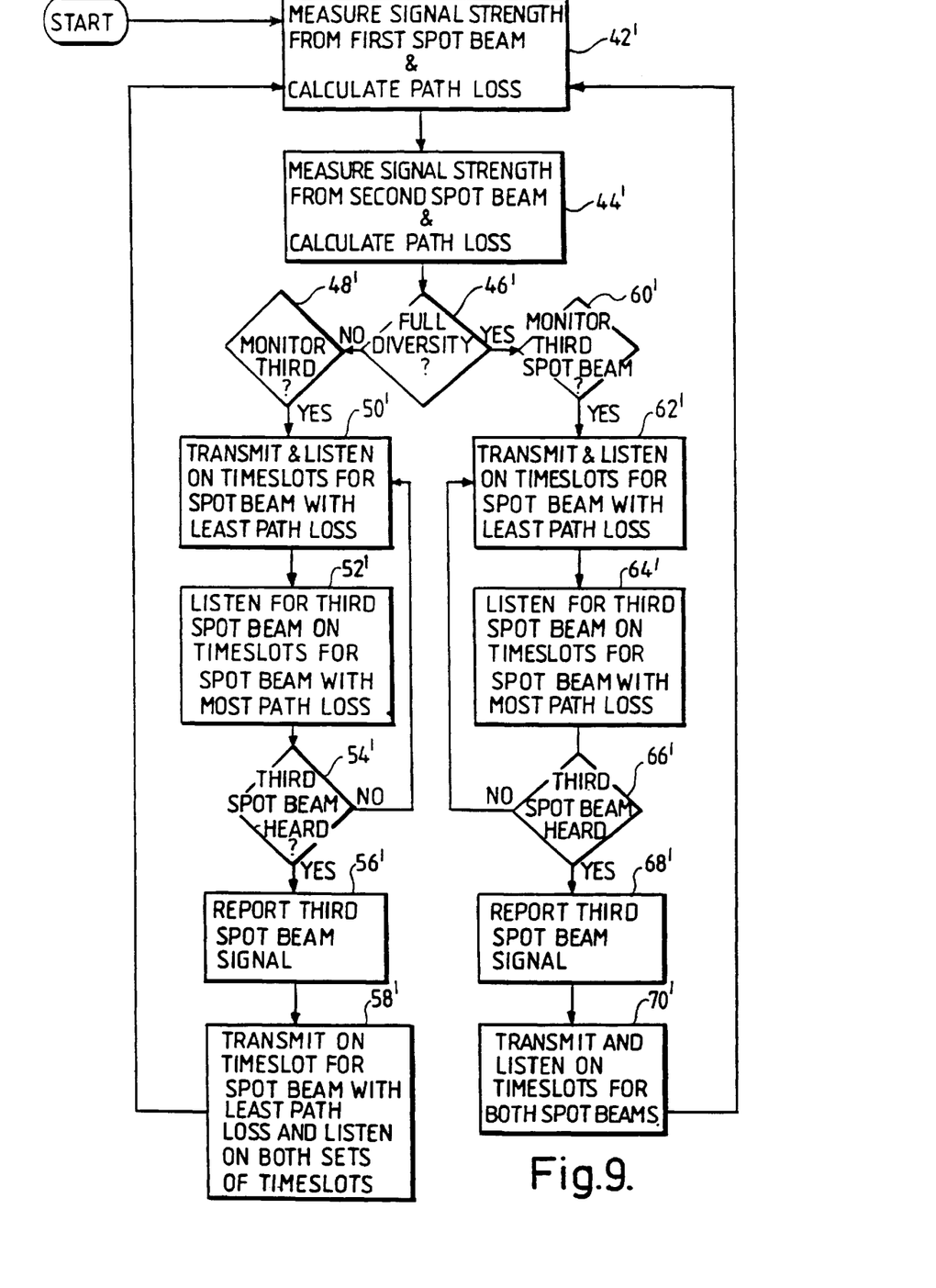
FIG. 9 is a flow chart showing the activity of the user terminal when operating according to the preferred embodiment of the present invention when determining the desirability of engaging a further spot beam.

FIG. 9 is a flow chart of how the present invention is applied to the problem of assessing additional spot beams 32 while the user terminal 10 is operating in full or half duplex between first and second spot beams 32. The same numbers 42' to 70' apply to similar operations, and the same description applies, as is provided above, with the exception that the first and second satellites 14, 16 become, respectively, first and second spot beams 32, and the third satellite 22 becomes a third spot beam 32. Similarly, it is to be understood that each spot beam 32 is capable of providing its own BCCH burst 40, and that each spot beam 32 can provide a slow associated control channel (such as SACCH1 or SACCH2).

What is claimed is:

1. A satellite communications system comprising a user terminal, at least one earth station, and at least three satellites, wherein:

said user terminal is configured to be in radio contact with said at least one earth station through at least two of said at least three satellites and configurable to be in radio contact through another of said at least three satellites, and said user terminal being operable to assess which of said at least two satellites presents the highest radio path attenuation to said user terminal and to interrupt the radio path between said user terminal and that one of said at least two satellites which presents the highest path attenuation so as to allow said user terminal to assess information relating to synchronization and information related to the signal quality of said another satellite.

2. A system, according to claim 1, wherein said user terminal is operable to indicate to at least one of said earth stations the information measured pertaining to said another satellite.

3. A system, according to claim 1, wherein said terminal is operable to select which of said radio paths between said user terminal and said at least two satellites to interrupt.

4. A system, according to claim 3, wherein one of at least two earth stations providing said paths is operable to select which of said radio paths between said user terminal and said at least two satellites to interrupt.

5. A system, according to claim 4, wherein each of said at least two satellites is operable to provide an indication of its respective transmission power to said user terminal, wherein said user terminal is operable to measure a received signal from each of said at least two satellites, and wherein said radio path attenuation for each of said at least two satellites is calculated by comparing said received signal with said indication of transmitted power.

6. A system according to claim 5, wherein said user terminal is operable to provide an indication to at least one of said earth stations for the selection of that radio path with most attenuation to be interrupted.

7. A system, according to claim 5, wherein said user terminal is operable to indicate to at least one of said earth stations which one of said at least one corresponding radio path to interrupt.

8. A satellite communications system wherein a user terminal may be in radio contact with at least one earth station through at least one radio path to at least two satellites and wherein another satellite may potentially be included among said at least two satellites, said system being characterized by said user terminal being operable to assess which of said at least two satellites presents the highest radio path attenuation to said user terminal and to interrupt the radio path between said user terminal and that one of said at least two satellites which presents the highest path attenuation for said user terminal to assess information related to synchronization and information related to the signal quality of said another satellite.

9. A system, according to claim 8, wherein said user terminal is operable to indicate to at least one of said earth stations the information measured pertaining to said another satellite.

10. A system, according to claim 8, wherein said terminal is operable to select which of said radio paths between said user terminal and said at least two satellites to interrupt.

11. A system, according to claim 10, wherein one of at least two earth stations providing said paths is operable to select which of said radio paths between said user terminal and said at least two satellites to interrupt.

12. A system, according to claim 11, wherein each of said at least two satellites is operable to provide an indication of its respective transmission power to said user terminal, wherein said user terminal is operable to measure a received signal from each of said at least two satellites, and wherein said radio path attenuation for each of said at least two satellites is calculated by comparing said received signal with said indication of transmitted power.

13. A system according to claim 12, wherein said user terminal is operable to provide an indication to at least one of said earth stations for the selection of that radio path with most attenuation to be interrupted.

14. A system, according to claim 12, wherein said user terminal is operable to indicate to at least one of said earth stations which one of said at least one corresponding radio paths to interrupt.

* * * * *